(12) United States Patent
Noel (10) Patent No.: US 8,472,909 B2
(45) Date of Patent: Jun. 25, 2013

(54) FILTER DEVICE FOR DETECTING AND/OR REMOVING ERRONEOUS COMPONENTS IN AND/OR FROM A SIGNAL

(75) Inventor: Denis Noel, Grez-Doiceau (BE)

(73) Assignee: NXP, B.V., Eindhoven (NL)

( * ) Notice: Subject to any disclaimer, the term of this patent is extended or adjusted under 35 U.S.C. 154(b) by 249 days.

(21) Appl. No.: 12/993,901

(22) PCT Filed: May 20, 2009

(86) PCT No.: PCT/IB2009/052100
§ 371 (c)(1),
(2), (4) Date: Nov. 22, 2010

(87) PCT Pub. No.: WO2009/141790
PCT Pub. Date: Nov. 26, 2009

(65) Prior Publication Data
US 2011/0076978 A1 Mar. 31, 2011

(30) Foreign Application Priority Data
May 21, 2008 (EP) .................................... 08104060

(51) Int. Cl.
*H04B 1/10* (2006.01)
(52) U.S. Cl.
USPC ............................ 455/307; 455/323; 455/334
(58) Field of Classification Search
USPC .................. 455/296, 307, 312, 323, 334, 339
See application file for complete search history.

(56) References Cited

U.S. PATENT DOCUMENTS

| 4,368,434 A | 1/1983 | Miller et al. | |
|---|---|---|---|
| 7,366,663 B2 * | 4/2008 | Beerends et al. | 704/231 |
| 2003/0063410 A1 * | 4/2003 | Yoon | 360/75 |
| 2004/0157571 A1 | 8/2004 | Wortel et al. | |

FOREIGN PATENT DOCUMENTS

| JP | 2-009249 A | 1/1990 |
|---|---|---|
| JP | 3-104355 A | 5/1991 |

OTHER PUBLICATIONS

Dinneen, G., et al. "An Analysis of Signal Detection and Location by Digital Methods," IRE Transactions—Information Theory, IEEE, vol. 1, pp. 29-38 (Mar. 1956).
Lee, E. et al. "A Novel Wireless Communication Device and its Synchronization Scheme," IEEE Global Tele. Conf. 1995, Conference Record, Communication Theory Mini-Conference, vol. 1, pp. 659-663 (Nov. 13, 1995).
Kwon, H., et al. "A Novel Digital FM Receiver for Mobile and Personal Communications," IEEE Trans. on Communications, vol. 44, No. 11, pp. 1466-1476 (Nov. 1996).
Mun, K., et al. "Symbol Synchronization for Zero-Crossing Demodulator Under Static and Mobile Fading Environments," Military Comms. Conf. Proc., IEEE, vol. 1., pp. 341-345, (Oct. 1999).
International Search Report and Written Opinion for Int'l patent appln. No. PCT/IB2009/052100 (Nov. 5, 2009).

* cited by examiner

*Primary Examiner* — Nhan Le (57) ABSTRACT

The invention relates to a filter device (341, 342) for detecting and/or removing erroneous components like noise, deformations, glitch components or other errors in and/or from a signal, to a demodulation device using the filter device, to an information transmission system using the demodulation device and to a method for detecting a noise impulse in an input signal ($C\alpha(t)$, $C\alpha[k]$). The filter device includes a summing element (510-51N, 610) connected to a correction element (540, 640). The summing element (510-51N, 610) sums the input signal ($C\alpha(t)$, $C\alpha[k]$) within a reference interval (N) and the correction element (540, 640) verifies the summed input signal (IS[k]) with at least one signal condition (0, N+1, $\Delta C\alpha[k]$). Finally, the correction element (540, 640) outputs a predetermined signal ($C\alpha_c[k]$) based on the result of the verification between the summed input signal (IS[k]) with at least one signal condition (0, N+1, $\Delta C\alpha[k]$). The foregoing filter device is able to remove noise from an input signal. This stabilizes the input signal against environmental influences occurring e.g. during signal transmission.

17 Claims, 4 Drawing Sheets

FILTER DEVICE FOR DETECTING AND/OR REMOVING ERRONEOUS COMPONENTS IN AND/OR FROM A SIGNAL

FIELD OF THE INVENTION

The invention relates to a filter device for detecting and/or removing erroneous components in and/or from a signal, to a demodulation device using the filter device, to an information transmission system using the demodulation device and to a method for detecting a noise impulse in a signal.

BACKGROUND OF THE INVENTION

Complex transmission schemes as used in commonly known transmission systems like mobile communication, radio broadcasting or satellite transmission are well known in the fields of information transmission. Therein, information is complexly transmitted from a transmitter to a receiver locally displaced to each other. In the transmitter, a complex modulator multiplies an information signal with two linearly independent signals. The result is a complex modulation signal including two real signal components. Next, the complex modulation signal is modulated onto a high-frequency signal and transmitted from the transmitter to the receiver via an antenna. In the receiver, a complex demodulator reconstructs the information signal from the complex modulation signal based on a suitable demodulation technique. The complex and high-frequency modulation can also be performed in one single step. Complex transmission schemes were introduced in form of the single side band modulation, which was especially used for information transmission in the high-frequency spectrum (HF-spectrum).

The linearly independent signals used for generating the complex modulation signal are usually chosen as sinus-signal and cosinus-signal. Since these signals comprise the same amplitude but a phase-difference of 90°, the complex modulator and demodulator can be described with complex numbers facilitating the overall calculation and design process. The sinus-signal is known as in-phase signal, wherein the cosinus-signal is known as quadrature signal. The main advantage of complex transmission schemes is an efficient utilization of the available bandwidth.

Subsidiary, but important transmission schemes within complex transmission schemes are digital transmission schemes. Therein, the information signal includes a bit stream, which can be particularly efficiently transmitted in the above described complex modulation signal. Practically, the bit stream and the complex modulated signal are divided into a plurality of symbols each comprising the same length. Each bit sequence of the same structure will be allocated to a predetermined symbol type having a unique amplitude and phase in the complex modulation signal. Such digital complex modulation schemes are well known in the prior art and provide the advantage, that the information included in the information signal can be transmitted with higher quality compared to analog complex modulation schemes.

Particularly of interest in the fields of digital complex modulation schemes are complex angle modulation schemes like phase shift keying (PSK) and frequency shift keying (FSK). Therein, the information signal including the bit stream is merely modulated into the phase of the complex modulation signal. Although these transmission schemes inefficiently utilize the available bandwidth, the main advantage is that the signal is more robust against non-linearities.

Complex demodulators for demodulating the above described complex modulation signal may work according to a plurality of technical principles. The most important complex modulator types are cross-differential-cross multiply demodulators (CDM), limiter-discriminator integrate demodulators (LDI) and zero crossing demodulators (ZCD). Whereas a CDM demodulator is highly complicated since it requires a lot of electronic components leading to high power consumption, a LDI demodulator is highly error prone. A good compromise could be provided by the ZCD demodulator combining the advantages of the LDI demodulator and the CDM demodulator. However, this is only given, if the amount of different symbol types in the complex modulation signal is sufficiently high.

The ZCD demodulator basically consists of a plurality of phase detectors and a reconstructing processor. Each of the phase detectors receives the complex modulation signal and provides its output to the reconstructing processor. There is one phase detector for each predetermined symbol type detecting whether the phase of the modulated complex signal is higher or lower than the phase of the predetermined symbol type. Based on this information, the processor determines whether the modulated complex signal turns clockwise or anti-clockwise in the complex area and reconstructs the whole bit stream of the information signal based on predetermined mathematics.

Theoretically the output of each phase detector is constant at least over the duration of the predetermined symbol type. However, practically in the receiver, the complex modulation signal is noisy. This makes the complex modulation signal jittering while turning. However, due to this jittering, the complex modulation signal crosses the phase of a predetermined symbol type forward and backward with very high frequency. This leads to to a plurality of very short pulses output by the respective phase detectors. These short pulses are glitch components and therewith noise in the received information signal. In other words, the jittering could affect and even distort the whole reconstruction processing after the phase deciders.

OBJECT AND SUMMARY OF THE INVENTION

It is therefore an object of the invention to provide a filter device for removing deformations, glitch components or other errors from a signal and a method for detecting deformations, glitch components or other errors in a signal.

The invention is based on the thought that noise like deformations, glitch components or other errors in a signal cannot be detected at a predetermined point in time but only by analyzing the signal over a complete time period in one piece. Thus, to detect errors in a signal, the invention proposes to define a reference interval, which length is preferably longer than each erroneous component in the signal to be detected. To regard the signal in one piece, it is required to store the signal within the reference interval. This can be best achieved by summing the signal over the reference interval. To detect or remove the erroneous component, the summed signal needs to be verified with a predetermined condition—e.g. the sum of the ideal signal. The result of this verification can thus be taken to either unambiguously determine the presence of an erroneous signal component and/or to immediately correct the input signal.

Therefore, the present invention proposes a filter device for removing noise like deformations, glitch components or other errors from an input signal, which may be a received and modulated signal in a transmission system. The filter device includes a summing element and a correction element. The summing element sums the input signal within a reference interval. Based on a verification between the summed input signal and at least one signal condition, the correction element outputs a predetermined signal as filter output signal. In the context of the invention, "predetermined signal" means a signal determined within the correction element by reading out a memory, by calculation or by other suitable determination procedures prior outputting.

Due to the summing element, it is possible to catch a measurement value for observing the input signal over the reference interval in one piece. The advantage is that a sum can technically be realized in a simple way and verified with predetermined conditions, which are suitable to detect deformations, glitch components and other errors in the input signal. In other words, due to the observation of the input signal over a reference interval in one piece, an electronic signal can be easily corrected without bulky hardware resources.

Firstly, different embodiments for the summing element should be provided.

In one embodiment, the summing element may include a buffer element serially connected between an input of the filter device and a summing unit, wherein the buffer element timely delays the input signal. Therein, the input and the output of this buffer element are summed by the summing unit.

Alternatively, at least two buffers are connected in series between the input of the filter device and the summing unit. Therein, the first buffer may timely delay the input signal and the at least second buffer element may timely delay the output of its preceding buffer element. The total time delay of all buffer elements together may be less than or equal the reference interval. The summing unit sums the input of the first buffer element and the output of all buffer elements as summed input signal.

Using buffers and a summing element for summing the input signal is a suitable embodiment, which can be fully realized by hardware or by software. Since software solutions do not require new electronic components, the filter device can be easily integrated into existing electronic components, which are able to process software.

The summing element may be an integrator adapted to integrate the input signal during the reference interval. In the context of this embodiment, an integrator can be realized as analogue component (e.g. a capacitor) or as digital component (e.g. a counter).

Since integrators like capacitors and counters are cheap, space-saving and low in power consumption they do not only reliably fulfill their technical task but are also cost-effective and simply to produce.

Next, different embodiments for the at least one signal condition should be outlined. It can be roughly separated into likelihood-conditions and identity conditions. Based on a likelihood condition, a measured signal is allocated to one of at least two different ideal signal shapes. In contrary thereto, identity conditions are suitable to determine whether a signal deviates from at least one ideal signal shape.

The at least one signal condition may be a threshold level and the correction element may output a first predetermined signal if the summed input signal raises the threshold level, and a second predetermined signal if the summed input signal falls below the threshold level.

The threshold level is a likelihood condition. Therein, the noise in the input signal will not be classified by quality, intensity or duration but only removed. This embodiment gets especially effective if the input signal is simple. In case of a binary input signal (the signal has only two levels) the filter process is reduced in so far that only one decision for determining the output signal of the filter device is necessary. Thus, the less decisions are necessary, the less calculation time is required, reducing the response time of the whole filter device.

The at least one signal condition may be a first and/or second signal shape condition indicating the summed value of a first predetermined signal and a second predetermined signal within the reference interval. Therein, the correction element may either output the input signal, if the output of the summing element corresponds to the first or second signal shape condition or output a corrected input signal in all other cases, wherein the corrected input signal may be created based on at least one preceding input signal value.

The predetermined signal shapes as signal conditions are identity conditions that enable to determine whether the flow of the input signal deviates from an ideal signal flow. In other words, it is not only possible to correct the input signal but also to classify the noise in the input signal in respect to suitable conditions like quality, intensity or duration. This information can be used further to evaluate variables about the source or the transmission channel of the input signal and therewith to facilitate the signal correction.

The input signal may be a pulse shaped signal carrying digital information.

Pulse shaped signals for indicating digital information are not only easy to sum, the at least one signal condition for the input signal can be formulated also very simple. It therefore allows implementing a less complex filter device with a quick response time and low energy consumption.

The pulse shapes of the input signal may be rectangular. If the correction element detects noise, a preceding value of the input signal may be outputted one more time.

Since rectangular pulses have a constant pulse level over a predetermined time period and the correction element merely outputs preceding input signal values for correcting the input signal, it is possible to omit a difficult and complex prediction. This further reduces the complexity of the filter device.

The reference interval may be longer than a longest noise component in the input signal.

By doing this, it is secured, that all noise components can be detected within one reference interval.

The present invention further proposes a demodulation device including a filter device as described above.

The demodulation device reconstructs an information signal based on a modulated signal including at least one modulated signal component. It includes a separation element, a pre-processor and a processor. The separation element separates the modulated signal into the single modulated signal components (e.g different symbols types included in the modulated signal). The pre-processor includes at least one filter device according to the present invention for each of the modulated signal component and reduces or removes noise from each of the modulated signal components. The filtered modulated signal components are finally reconstructed to an information signal in the processor.

Due to filtering the modulated signal components, parasitic pulses are removed, such that the overall robustness of the demodulation device is increased. This allows constructing the demodulation device more robust and fault-tolerant with simple hardware means. This saves production and material costs for the demodulation device.

The demodulation device may be a zero crossing detector.

Since the phase crossings in a zero crossing detector are very prone to parasitic pulses occurring due to jittering of the modulated signal around the phase of a predetermined symbol type, the present invention is especially suitable for these kinds of demodulation devices.

The demodulation device may further including a post-processor for deriving predetermined boundary information having a periodic structure in the information signal.

The periodic structure in the modulated signal can be used to define the reference interval or the time limits during which the pre-processor should perform the noise reduction. The boundary information can be easily derived from the information signal itself, based on considering e.g. a bit stream. On contrary thereto, it is technically complex to derive the boundary information from the modulated signal directly. Thus, the boundary information derivation in the pre-processor is not only simple but also technically and economically effective.

The boundary information may be the start and end of a bit-sequence in the information signal.

This embodiment is suitable, since in digital information transmission, bit-sequences are modulated onto a pulse in the modulation signal. Thus, these bit-sequences are a suitable indicator for the pulses of the modulation signal and therewith for the reference interval.

The boundary information may be derived based on a phased-locked loop.

If bit transitions occur at equally spaced time intervals, they can be detected in the demodulated signal. If the provided signal contains enough bit transitions (which can be guaranteed with suited data encoding techniques), the bit or symbol boundaries can be recovered using a phase lock loop.

A transmission system according to the present invention for transmitting an information signal includes at the transmitting side a modulator, an optional up-mixer and a first antenna for transmitting a transmission signal, and at the receiving side a second antenna for receiving the transmission signal, an optional low-noise amplifier, an optional down-mixer and a demodulator as described above. The modulator at the transmitting side modulates the information signal to a modulated signal, which is optionally mixed with a high-frequency signal to a transmission signal in the up-mixer. In case of a direct carrier modulation system, the up-mixer can be omitted. This transmission signal is transmitted between the two antennas. At the receiving side, the optional low noise amplifier amplifies the received transmission signal and provides it to the optional down-mixer, which optionally removes the high-frequency signal from the received transmission signal in case of a non-direct carrier modulation system. Finally, the demodulator reconstructs the information signal out of the received transmission signal provided by the down-mixer.

In a preferred embodiment, the transmission system is a magnetic induction transmission system as used in wireless data transmission, in mobile communication or in Bluetooth communication, to which the present invention can be employed very effectively, since magnetic induction systems are very non-linear and noise-dependent.

A method for detecting noise like deformations, glitch components or other errors in an input signal includes summing the input signal within a reference time interval, verifying the summed input signal with at least one signal condition and generating a noise detection signal indicating whether the summed input signal fulfils the at least one signal condition. Therein, the noise pulse has a noise duration shorter than the reference time interval.

BRIEF DESCRIPTION OF THE DRAWINGS

The invention will be described in greater detail hereinafter, by way of non-limiting examples, with reference to the embodiments shown in the drawings.

DETAILED DESCRIPTION OF EMBODIMENTS

Figure 1:
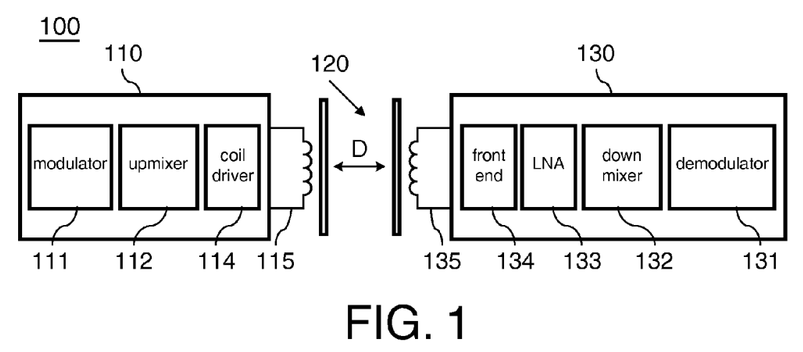
FIG. 1 is a signal transmission system including a filter device according to the present invention.

FIG. 1 is a signal transmission system including a filter device according to the present invention. The signal transmission system 100 includes a transmitter 110, a transmission path 120 and a receiver 130. Therein, the transmitter 110 operates according to a conventional transmitter and modulates an information signal onto a transmission signal, which will be transmitted via the transmission path 120 to the receiver 130. The receiver 130 finally reconstructs the modulation signal from the received transmission signal and provides the information signal based on the reconstructed modulation signal. As described later in further detail, the transmission path 120 distorts the transmission signal by noise, such that the receiver 130 does not receive an exact copy of the original transmission signal. However, this distortion influences the reconstruction of the information signal. With the filter device according to the present invention, the noise in the received transmission signal or the reconstructed modulation signal can be reduced or even completely removed.

In a preferred embodiment, the transmitter 110 includes a modulator 111, an up-mixer 112, a coil driver 114 and a first antenna 115. The modulator 111 takes the information signal and creates based thereon the modulation signal. This modulation signal is then mixed with a high-frequency signal in the up-mixer 112 to create the transmission signal, which is finally provided to the coil driver 114. The coil driver 114 prepares the transmission signal by e.g. amplifying and transmits it via the first antenna 115 to the receiver 130.

The receiver 130 preferably includes a second antenna 135, a front end 134, a low-noise amplifier 133, a down-mixer 132 and a demodulator 131. The frond end 134 receives the transmission signal on the frequency of the high-frequency signal via the second antenna 135. The low-noise amplifier 133 amplifies the received transmission signal and provides it to the down-mixer 132, which removes the high frequency signal from the received transmission signal. Thus, in the down-mixer 132, the modulation signal is reconstructed. Finally, the demodulator 131 reconstructs the information signal based on the reconstructed modulation signal. For facilitating the reconstruction of the information signal, the demodulator 131 includes the filter device according to the present invention. It enables to stabilize the reconstructed modulation signal and to improve the reconstruction of the information signal.

Prior discussing the working principle of the present invention in further detail, a model for the transmission path 120 should be discussed in further detail.

Figure 2:
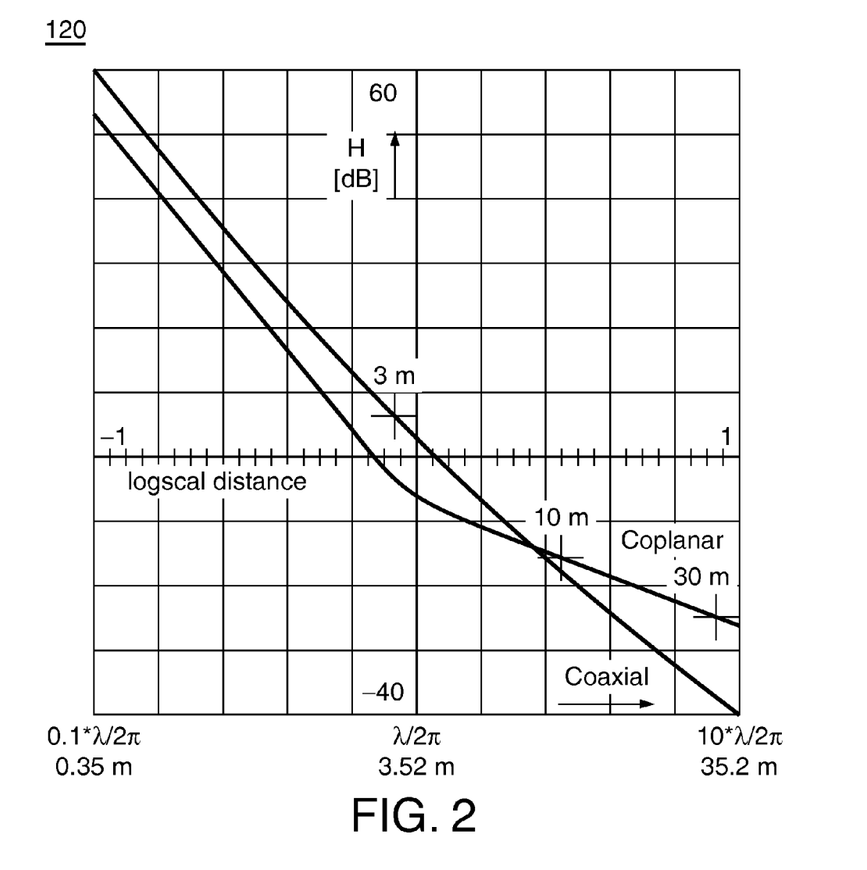
FIG. 2 is diagram discussing the H-field from the transmitter antenna of the signal transmission system versus the distance.

FIG. 2 is diagram discussing the H-field around the first antenna 115 of the signal transmission system 100 versus the distance. In the diagram, it is assumed that the signal transmission system 100 is based on magnetic induction technology. Thereafter, the first antenna 115 is a coil through which a sinusoidal current representing the transmission signal is flowing to generate a magnetic flux in a quasi-static magnetic field. The second antenna 135 is also a coil, through which the magnetic flux generated from the first antenna 115 is passing and inducing a modulated current representing the received transmission signal.

The quasi-static magnetic field generated by the first antenna 115 can be divided into three basic components, a linear inverse term $r^{-1}$, a square inverse term $r^{-2}$ and a cube inverse term $r^{-3}$.

Square and cube inverse terms $r^{-2}$, $r^{-3}$ are called "near field term" and used to calculate matching pairs of E and B vectors standing orthogonal to each other and to the radial vector of the first antenna 115. The linear inverse term $r^{-1}$ is called "far field term" used to calculate both, the E and B vectors, at distances much greater that the wavelength.

At short distance from the current loop, near field term dominates and is the major contributor. The cube inverse term $r^{-3}$ is used to calculate the magnetic field component. It is independent of frequency, such that any frequency can be employed in the near-field domain, for the current in the first antenna 115, to generate a specified magnetic flux through the second antenna 135 in the receiver 130. In the near-field region of the first antenna 115, the properties of the quasi-static magnetic field are primarily determined by the source characteristics, and the electric field component is much weaker than the magnetic field component. The total power radiated by the first antenna 115 is however frequency dependent and proportional to $\lambda^2$, wherein $\lambda$ is the wavelength of the transmission signal transmitted from the first antenna 115.

At the distance of $\lambda/2\pi$ from the first antenna 115, the linear, square and cube inverse terms $r^{-1}$, $r^{-2}$, $r^{-3}$ equally contribute to the quasi-static magnetic field. This distance is often referred to as "near field—far field boundary".

At distances larger than $\lambda/2\pi$ from the first antenna 115, the far-field components dominate, the electric and magnetic field components are directly proportional to one another, and the properties of the quasi-static magnetic field depend primarily on the characteristics of the medium through which the quasi-static magnetic field is propagating.

Figure 3:
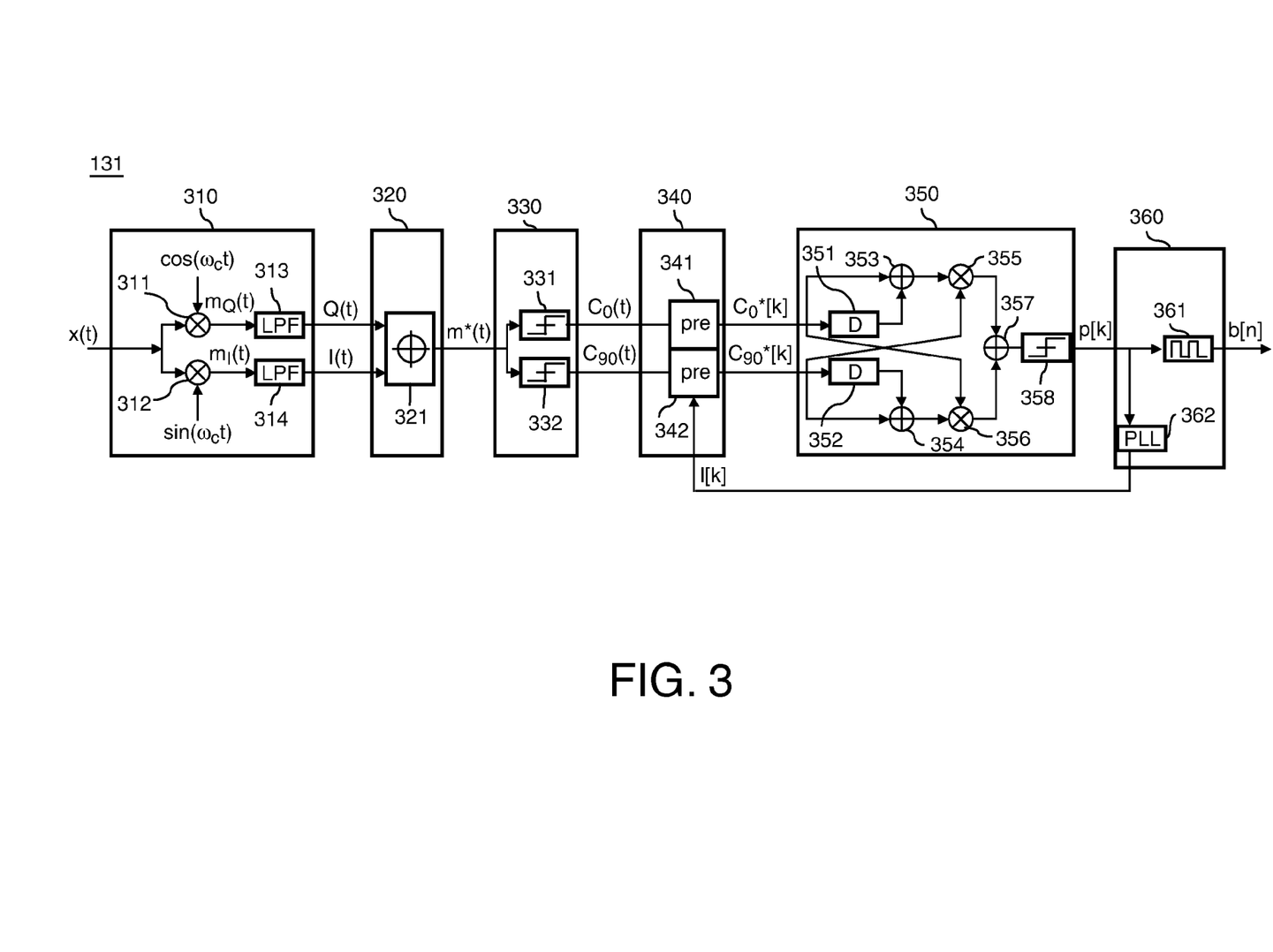
FIG. 3 is a demodulator included in the signal transmission system according to the present invention.

FIG. 3 is a demodulator included in the signal transmission system. The demodulator 131 preferably consists of a mixing element 310, a baseband element 320, a deciding element 330, a pre-processing element 340, a processing element 350 and a post-processing element 360. The mixing element 310, the baseband element 320 and the deciding element 330 can be summarized as separation element for separating at least one signal component from a modulation signal.

The mixing element 310 receives a modulation signal x(t) and generates a in-phase signal component I(t) and a quadrature signal component Q(t) based thereon. These components are provided to the baseband element 320 generating a baseband signal mα(t) turning in the complex area. Based on the baseband signal mα(t), the deciding element 330 generates crossing signals C∝(t) indicating whether the phase of the baseband signal mα(t) is larger or smaller than a predetermined phase. In the present embodiment these predetermined phases are 0° and 90°. The crossing signals C∝(t) are next provided to the pre-processor 340 for sampling. Further, the pre-processor 340 removes noise from the crossing signals C∝(t) according to the principle of the present invention. The sampled and filtered crossing signals C∝α[k] are provided to the processor 350 generating a pulse sequence p[k] indicating the number of phase crossings of the baseband signal mα(t) in positive and negative direction in the complex area. In view of the present embodiment, this means that the pulse sequence p[k] indicates whether and how often the baseband signal mα(t) crossed the phases 0° and 90° clockwise or anti-clockwise. Finally, the pulse sequence p[k] is provided to the post-processor 360 reconstructing the information signal in form of a bit stream b[n] out of the pulse sequence p[k]. Further, the post-processor 360 derives boundary information l[k] for facilitating the pre-processing in the pre-processor 340.

The mixing element 310 includes two orthogonal signal sources 311, 312, with which the modulation signal x(t) is respectively multiplied. This results into a modulated in-phase signal $m_I(t)$ and modulated quadrature signal $m_Q(t)$ each comprising a high frequency and a low frequency portion. The low frequency portion is respectively filtered by low-pass filters 313, 314 resulting into the in-phase signal component I(t) and the quadrature signal component Q(t).

The baseband element 320 includes a mixing element 321 mixing the in-phase signal component I(t) and the quadrature signal component Q(t) together to the baseband signal mα(t).

In the present embodiment, the deciding element 330 includes a first decider 331 for outputting a first crossing signal $C_0(t)$ depending on whether the phase of the baseband signal mα(t) is smaller or larger than the 0° and a second decider 332 for outputting a second crossing signal $C_{90}(t)$ depending on whether the phase of the baseband signal mα(t) is smaller or larger than the 90°.

The pre-processor 340 includes a first and second filter device 341, 342 according to the present invention for respectively filtering and sampling the first crossing signal $C_0(t)$ and second crossing signal $C_{90}(t)$. Both filter devices 341, 342 may further receive the boundary information l[k] for receiving information about the limits of the bit sequence b[n] to be demodulated by the demodulator 131.

The processor 350 includes two delay elements 351, 352, three summers 353, 354, 357 and two multipliers 355, 356. These elements together are used to realize the following equation:

$$p[k]=C_0[k] \cdot C_{90}[k-1]-C_0[k-1] \cdot C_{90}[k] \qquad (1)$$

This equation represents the basic principle for a zero-crossing demodulator enabling to detect whether and how often the baseband signal mα(t) crosses one of the two phases 0° and 90° clockwise or anti-clockwise. In case of clockwise crossing, a positive pulse will be generated based on equation (1). In case of anti-clockwise crossing, a negative pulse will be generated based on equation (1). As well known for a skilled person, a detection in a zero-crossing demodulator can be performed based on more than two predetermined phases. Thus, in a zero-crossing demodulator, equation (1) can also be applied to more predetermined phases standing orthogonal to each other in the complex area, such that the detection of the movement of the baseband signal mα(t) can be performed arbitrarily exactly with a suitable sensitivity. A further detailed explanation of the zero crossing demodulation principle will be given later.

The post-processor 360 includes a counter 361 and a phased locked loop 362. The counter 361 counts the pulses in the pulse sequence p[k] and generates the bit stream b[n]. The generation of the bit stream b[n] based on the pulse sequence p[k] is a well known procedure and should not be explained in further detail. As for example, in the case of FSK modulation, the bit stream b[n] can be recovered by counting when the pulse sequence p[k] is sampled. However, if the pulse signal p[k] is analog, the bit stream b[n] can be recovered by integrating a pulse over a bit period. In every case, if the integration or counting result is negative, the output bit of the bit stream b[n] should be a '1 '. Otherwise it should be a '0'. Further, the phased locked loop 362 derives the required bit period as boundary information based on the pulses to indicate the limits of each pulse facilitating the sampling and filtering of the crossing signals $C_0(t)$, $C_{90}(t)$ in the pre-processor 340.

Figure 4:
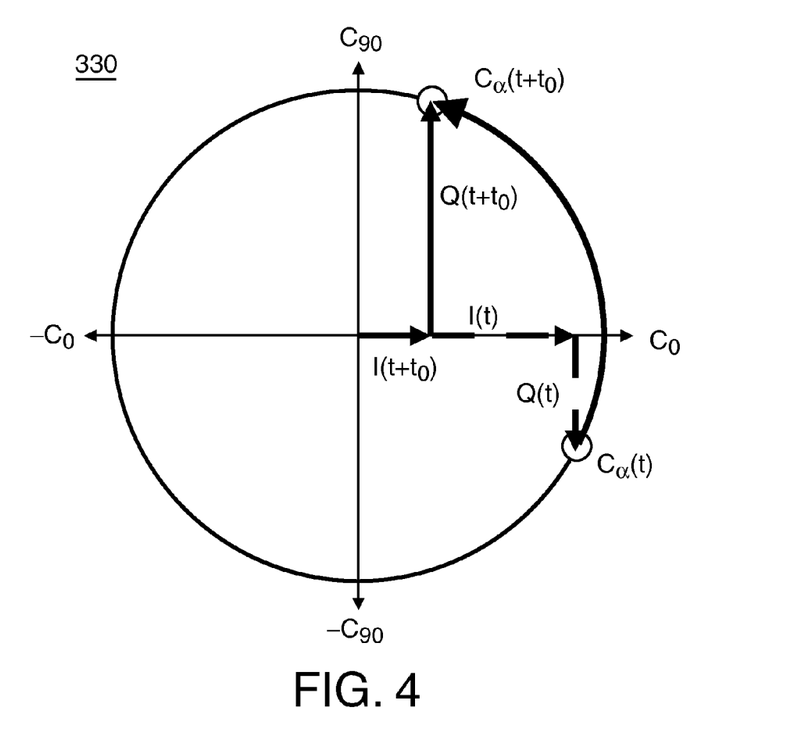
FIG. 4 is a diagram illustrating the working principle of the phase decider included in a zero-crossing demodulator according to the present invention.

FIG. 4 is a diagram illustrating the principle of the pulse generation in a zero crossing demodulator. The diagram shows the complex area, wherein two phases 0° and 90° and their respective linear dependent phases −0° and −90° are indicated. The baseband signal $m\alpha(t)$ is shown by its quadrature components $Q(t)$, $I(t)$ at two different points in time t, t+$t_0$. Between these two different points in time, the baseband signal $m\alpha(t)$ crosses the phase 0° clockwise.

This phase crossing will be detected as follows. In the deciding element 330 at the time point t, the first decider 331 will output a negative first crossing signal $C_0(t)$ and the second decider 332 will output a negative second crossing signal $C_{90}(t)$, since the phase of the baseband signal $m\alpha(t)$ is smaller than 0° and 90°. Thus, the sampled values for the crossing signals $C_0(t)$, $C_{90}(t)$ at the time point t will be $C_0[k]=-1$ and $C_{90}[k]=-1$. After the time $t_0$, the baseband signal $m\alpha(t)$ moved, the first decider 331 will now output a positive value, since the phase of the baseband signal $m\alpha(t)$ is now larger than 0°. The output of the second decider 332 will not change. Therefore, the sampled values for the crossing signals $C_0(t+t_0)$, $C_{90}(t+t_0)$ at the time point t+$t_0$ will be $C_0[k+1]=1$ and $C_{90}[k+1]=-1$. Based on the calculation scheme provided by equation (1), the processor 350 will calculate and output:

$$p[k+1]=(1)\cdot(-1)-(-1)\cdot(-1)=-2 \qquad (2)$$

Thus, based on the rule provided above (negative pulse=clockwise turning, positive pulse=anti-clockwise turning), the pulse sequence $p[k]$ indicates that the baseband signal $m\alpha(t)$ turns clockwise during the time points t and t+$t_0$.

However, the deciders 331, 332 in the deciding element 330 output analog crossing signals $C\propto(t)$. These analog crossing signals $C\propto(t)$ are prone to noise especially if the baseband signal $m\alpha(t)$ jitters around the phases 0° or 90° due to noise in the baseband signal $m\alpha(t)$. This would lead to noise pulses in the crossing signals $C\propto(t)$. These noise pulses are called parasitic pulses reducing the robustness of the whole zero crossing demodulator. Therefore, the filter device according to the present invention is especially suitable to increase the robustness of a zero crossing demodulator. This filter device can be preferably realized according to the two embodiments hereinafter shown.

Figure 5:
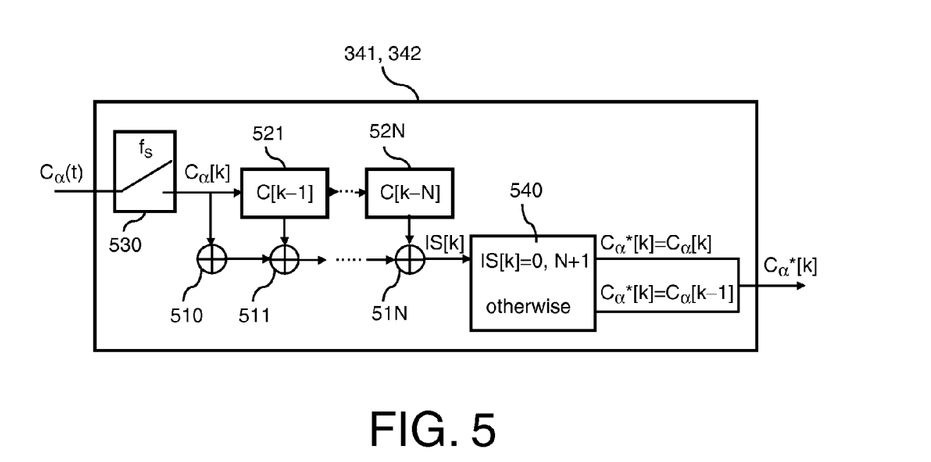
FIG. 5 is a first embodiment of the filter device according to the present invention.

FIG. 5 is a first embodiment of the filter device according to the present invention. Thereafter, the filter device 341, 342 includes a plurality of summing units 510-51N, a plurality of serially connected buffers 521-52N, a sampling element 530 and a correction element 540.

The sampling element 530 samples the incoming crossing signal $C\propto(t)$ according to a predetermined sampling frequency $f_s$. The sampled values $C\propto[k]$ are stored into the first buffer 521 of the plurality of the buffers 521-52N. Synchronously, the content of the first buffer 521 is moved to the second buffer, and so on. The input of the first buffer 521 and the output of all buffers 521-52N is summed together by the plurality of summing units 510-51N to create an intermediate signal $IS[k]$. Based on this intermediate signal, the correction element decides whether to output the content of the first buffer 521 or the content of the second buffer as filtered crossing signal $C\propto\alpha[k]$.

The decision is made based on the following thought. The incoming crossing signal $C\propto(t)$ includes pulses indicating whether the baseband signal $m\alpha(t)$ is higher or lower a predetermined phase. Due to the principle of the used modulation scheme, phase crossings can only occur after predetermined time periods. It is therefore proposed to choose a reference interval, which is lower than these predetermined time periods during which the shape of the incoming crossing signal $C\propto(t)$ should be constant. Since the incoming crossing signal $C\propto(t)$ is sampled, this reference time interval is chosen as a numeric value N. Now, if the summed sampled incoming crossing signal $C\propto(t)$—namely the intermediate signal $IS[k]$—is equal to one of the ideal signal shapes, the filter device should output the currently sampled crossing signal value $C\propto[k]$. Otherwise, the filter device should start a correction procedure based on a preceding sampled crossing signal values $C\propto[k-1]$, $C\propto[k-2]$. In the simplest case, this correction procedure comprises to output the content of the first preceding sampled signal crossing value $C\propto[k-1]$ as indicated in the present embodiment.

Figure 6:
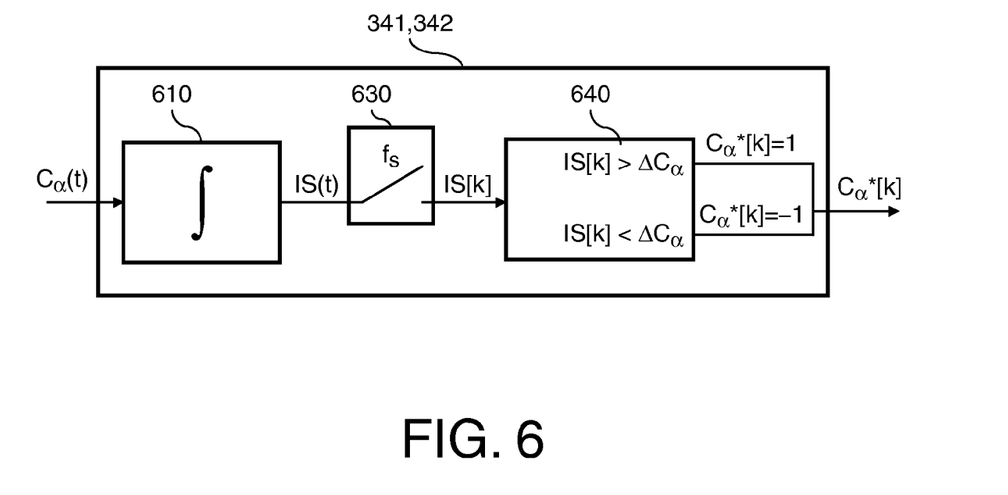
FIG. 6 is a second embodiment of the filter device according to the present invention.

FIG. 6 is a second embodiment of the filter device according to the present invention. Thereafter, the filter device 341, 342 includes an integrator 610, a sampling element 630 and a correction element 640.

The integrator 610 integrates the incoming crossing signal $C\propto(t)$ over a reference interval. According to the considerations taken out in the first embodiment, this reference interval should be shorter than the time periods between the phase crossings of the baseband signal $m\alpha(t)$. The integrated incoming crossing signal $C\propto(t)$ of the integrator 610 is sampled by the sampling element 630, such that the output of the sampling element 630 represents the intermediate signal $IS[k]$ analog to the first embodiment. In case of that the incoming crossing signal $C\propto(t)$ is already a discrete signal, the integrator 610 and the sampling element 630 can be substituted by a counter, which directly outputs the intermediate signal $IS[k]$. In the present embodiment, the correction element 640 decides whether the intermediate signal $IS[k]$ raises a predetermined threshold level $\Delta C\propto$. Based on this threshold level, the correction element 640 outputs a first or a second corrected crossing signal value $C\propto\alpha[k]$.

Thus, independently of the application of the filter device according to the first or second embodiment, the pre-processor 340 always outputs a noise free crossing signal $C\propto\alpha[k]$. This increases the robustness of the zero-crossing detection and facilitates the overall demodulation procedure.

In other words, the present invention provides a filter device applicable in mobile communication, radio broadcasting or satellite transmission and in the fields of information transmission. The filter device allows removing noise from an input signal by summing the input signal, such that the robustness of the input signal is increased by simple means.

The invention claimed is:

1. A demodulation device for reconstructing an information signal based on a modulated signal including at least one modulated signal component, the demodulation device comprising:
   a separation element, for separating each modulated signal component from the modulated signal;
   a pre-processing element including a filter device for each modulated signal component for removing noise from an input signal and for outputting a filtered modulated signal component; and
   a processing element for reconstructing the information signal based on the filtered modulated signal components;
   the filter device including:
      a summing element for summing the input signal within a reference interval; and
      a correction element for verifying the summed input signal with at least one signal condition and for outputting a predetermined signal based on a result of the verification between the summed input signal and the at least one signal condition.

2. The demodulation device according to claim 1, wherein the summing element includes at least two buffer elements serially connected between an input of the filter device and at least one summing unit, wherein
a first said buffer is adapted to timely delay the input signal;
at least a second said buffer is adapted to timely delay the output of its preceding buffer element;
the total time delay of all buffer elements together is less than or equal the reference time interval, and
the at least one summing unit is adapted to sum the input of the first buffer element and the output of all buffer elements to the summed input signal.

3. The demodulation device according to claim 1, wherein the summing element is an integrator for integrating the input signal during the reference interval.

4. The demodulation device according to claim 1, wherein
the at least one signal condition is at least a first and a second signal shape condition indicating the integrated value of a first predetermined signal and a second predetermined signal within the reference interval, and
the correction element is adapted
to output the input signal if the output of the summing element corresponds to the first or second signal shape condition, and
to output a corrected input signal in all other cases, wherein the corrected input signal is created based on at least one preceding signal value within the reference interval.

5. The demodulation device according to claim 1, wherein
the at least one signal condition is at least one threshold level, and
the correction element is adapted to output a first predetermined signal , if the summed input signal raises the at least one threshold level and a second predetermined signal if the summed signal falls below the at least one threshold level.

6. The demodulation device according to claim 2, wherein the input signal is a rectangular pulse shaped signal and the corrected input signal is the output signal of the first buffer.

7. The demodulation device according to claim 1, wherein the reference interval is longer than a longest noise component in the input signal .

8. The demodulation device according to claim 1, wherein the demodulation device is a zero crossing detector.

9. The demodulation device according to claim 1, further comprising a post-processing element for
deriving boundary information indicating a periodic structure in the information signal, and
providing the boundary information to the pre-processing element to define the reference interval.

10. The demodulation device according to claim 9, wherein the boundary information is a start and an end of a bit-sequence included in the information signal.

11. The demodulation device according to claim 9, wherein the boundary information are derived based on a phased-locked loop.

12. A transmission system for transmitting an information signal from a transmitter to a receiver, comprising:

a modulator adapted to modulate the information signal to a modulated signal;
a first antenna adapted to transmit the modulated signal to a second antenna;
the second antenna adapted to receive the modulated signal;
a demodulator according to claim 1 adapted to reconstruct the information signal based on the received modulated signal provided from the second antenna.

13. The transmission system according to claim 12, wherein the transmission system is a magnetic induction based transmission system.

14. The demodulation device as in claim 1, wherein the noise is at least one of deformations and glitch components.

15. A filter device for removing noise from an input signal, the filter device including:
a summing element for summing the input signal within a reference interval; and
a correction element for verifying the summed input signal with at least one signal condition and for outputting a predetermined signal based on a result of the verification between the summed input signal and the at least one signal condition;
wherein the summing element includes at least two buffer elements serially connected between an input of the filter device and at least one summing unit, wherein
a first said buffer is adapted to timely delay the input signal;
at least a second said buffer is adapted to timely delay the output of its preceding buffer element;
the total time delay of all buffer elements together is less than or equal the reference time interval, and
the at least one summing unit is adapted to sum the input of the first buffer element and the output of all buffer elements to the summed input signal.

16. The filter device according to claim 15, wherein the input signal is a rectangular pulse shaped signal and the corrected input signal is the output signal of the first buffer.

17. A filter device for removing noise from an input signal, the filter device including:
a summing element for summing the input signal within a reference interval; and
a correction element for verifying the summed input signal with at least one signal condition and for outputting a predetermined signal based on a result of the verification between the summed input signal and the at least one signal condition;
wherein
the at least one signal condition is at least a first and a second signal shape condition indicating the integrated value of a first predetermined signal and a second predetermined signal within the reference interval, and
the correction element is adapted to output the input signal if the output of the summing element corresponds to the first or second signal shape condition, and
to output a corrected input signal in all other cases, wherein the corrected input signal is created based on at least one preceding signal value within the reference interval.

* * * * *